United States Patent [19]

Dismukes et al.

[11] Patent Number: 5,872,070
[45] Date of Patent: Feb. 16, 1999

[54] PYROLYSIS OF CERAMIC PRECURSORS TO NANOPOROUS CERAMICS

[75] Inventors: John Pickett Dismukes, Toledo, Ohio; Jack Wayne Johnson, Clinton; James L. Pizzulli, Whitehouse Station, both of N.J.

[73] Assignee: Exxon Research and Engineering Company, Florham Park, N.J.

[21] Appl. No.: 778,531

[22] Filed: Jan. 3, 1997

[51] Int. Cl.$^6$ ..................................................... C04B 38/06
[52] U.S. Cl. .................. 501/80; 501/87; 501/88; 501/81; 528/25; 528/5; 528/4; 528/7; 528/32; 528/35; 528/38; 528/43; 528/10; 528/33
[58] Field of Search .................................. 501/80, 87, 88, 501/81; 528/4, 5, 7, 32, 35, 38, 43, 10, 33

[56] References Cited

U.S. PATENT DOCUMENTS

| | | | |
|---|---|---|---|
| 5,132,354 | 7/1992 | DeLaet ..................................... | 524/442 |
| 5,236,651 | 8/1993 | Garvey et al. ........................... | 264/140 |
| 5,266,207 | 11/1993 | Boye et al. .............................. | 210/653 |
| 5,514,350 | 5/1996 | Kear et al. ............................... | 422/198 |

*Primary Examiner*—Margaret W. Glass
*Attorney, Agent, or Firm*—Jay Simon

[57] ABSTRACT

The present invention provides for amorphous, nanoporous, ceramic material having a surface area in excess of 70 $m^2/gm$ and characterized by a high content of open microporous cell structure wherein the micropores have a mean width of less than 20 Angstroms and wherein said microporous structure comprises a volume of greater than about 0.03 $cm^3/gm$ of the ceramic. The invention also provides a process for the preparation of such nanoporous ceramics wherein a ceramic precursor polymer or oligomer is gradually heated in the presence of an inert gas or vacuum up to a maximum temperature in the range of greater than 400° C. up to about 650° C. Optionally, the process may also include a crosslinking step conducted prior to the heating step wherein the precursor polymer or oligomer is heated in the presence of a crosslinking agent capable of undergoing addition or substitution reactions with backbone atoms present in said precursor material, at an intermediate temperature of about 100° to 400° C. for a period of time sufficient to crosslink said precursor material, followed by pyrolysis of the crosslinked material.

28 Claims, No Drawings

PYROLYSIS OF CERAMIC PRECURSORS TO NANOPOROUS CERAMICS

BACKGROUND OF THE INVENTION

1. Field of the Invention

The present invention relates to the preparation of open pore, nanoporous ceramic materials having a high volume of microporous structure.

2. Description of Related Art

Porous materials play a particularly important role in a number of chemical processing industries and applications. Separations based on membranes are critical in such fields as chemical recovery, purification and dehumidification. Porous oxides (e.g. clays, silica, alumina and zeolites) are the materials of choice as catalysts or catalyst supports in chemical and petroleum processing reactions such as hydrocracking, catalytic cracking, hydrodesulfurization, reforming, and polymerization.

With respect to membrane technology, inorganic membranes offer a number of advantages over polymeric membranes which are typically limited to uses at temperatures below about 250° C. These include: i) higher operating temperatures, ii) greater structural integrity and hence the ability to withstand higher pressure differentials and back-flushing and iii) improved resistance to corrosion. Porous oxide, (e.g. aluminum oxide) and carbon membranes offer some of these characteristics, but advanced materials are still required for improved strength, toughness, structural integrity, temperature stability, water and oxygen resistance, thermal shock resistance, molecular selectivity to small molecules and gases, and high flux.

Similar considerations apply to clay and metal oxide type catalysts or catalyst supports, particularly as relates to stability and thermal shock resistance at temperatures above about 500° C.

Ceramic materials of the Si—C, Si—N, Si—C—N, Si—B—C, Si—B—N, Al—N, Si—Al—N, B—Al—N and related types appear to offer many of the properties set forth above. However, the sol-gel synthesis methods typically used to prepare porous oxide membranes or catalyst supports are incompatible with the preparation of ceramics of the type described above because of the need to use water in their preparation. Sintering or reactive sintering of these ceramics likewise produces materials with pore sizes of from about 0.1 to about 1000 microns which are non-uniform and generally too large for effective molecular separation and other uses described above. Chemical vapor deposition can produce microporous ceramic layers, but this tends to be an expensive, high temperature process with limited ability to tailor complex ceramic compositions.

Recently, researchers have discovered improved methods for preparing ceramics using ceramic precursors as starting materials. A ceramic precursor is a material, either a chemical compound, oligomer or polymer, which upon pyrolysis in an inert atmosphere and at high temperatures, e.g. above about 700° C., will undergo cleavage of chemical bonds liberating such species as hydrogen, organic compounds, and the like, depending upon the maximum pyrolysis temperature. The resulting decomposition product is typically an amorphous ceramic containing Si—C bonds (silicon carbide), Si—N bonds (silicon nitride) or other bond structures which will vary as a function of the identity of the ceramic precursor, e.g. Si—C—N, Si—N—B, B—N, Al—N and other bond structures, as well as combinations of these structures. Crystallization of these amorphous ceramic products usually requires even higher temperatures in the range of 1200°–1600° C.

The pyrolysis of various ceramic precursors e.g. polycarbosilanes, polysilanes, polycarbosiloxanes, polysilazanes, and like materials at temperatures of 1300° C. and higher to produce ceramic products, e.g. silicon carbide and/or silicon nitride, is disclosed, for example, in M. Peuckert et al., "Ceramics from Organometallic Polymers", Adv. Mater.2, 398–404 (1990). The pyrolysis of polyorganosilazanes under ammonia atmosphere at pyrolysis temperatures up to 1400° C. is also disclosed in Han et al., "Pyrolysis Chemistry of Poly(organosilazanes) to Silicon Ceramics", Chem. Mater., Vol. 4, No. 3, pp. 705–711 (1992).

During pyrolysis, preceramic precursors such as described above liberate various gaseous decomposition species such as hydrogen and organic compounds, including methane, higher molecular weight hydrocarbon molecules, lower molecular weight precursor fragments and H—C—N species. These gases tend to coalesce within the preceramic matrix as they form, resulting in a bulking or swelling of the mass. These entrained gases can lead to the formation of gas bubbles within the developing ceramic mass as the preceramic precursor crosslinks and hardens, resulting in a lower density ceramic having a voluminous, macroporous or mesoporous closed-cell structure, without development of a significant amount of open celled micropores.

In copending applications Ser. No. 08/248,290, now U.S. Pat. No. 5,643,987, and Ser. No. 08/248,291, now U.S. Pat. No. 5,563,212, each filed in the United States on May 24, 1994, it is disclosed that microporous ceramics can be achieved by the pyrolysis of a preceramic intermediate composition based on an intimate mixture of from about 30 to 99 parts by weight of a preceramic precursor polymer or oligomer and correspondingly from about 1 to 70 parts by weight of a particulate material having a particle size of less than 10 microns. In this process, pyrolysis is conducted at temperatures of up to less than about 1100° C. under flowing inert gas such as helium, argon or nitrogen, or under ammonia gas. Those inventions were based on the theory that the presence of a particulate filler in the preceramic matrix served to prevent the formation of large bubbles of decomposition gases as they were generated during decomposition under inert or ammonia gas, thereby yielding a microporous structure in the pyrolyzed product rather than a voluminous, macroporous mass of low bulk density which was achieved where pyrolysis was conducted under inert gas and the particulate material was not present in the precursor.

Also, copending U.S. application Ser. No. 08/385,299, now U.S. Pat. No. 5,696,217, filed Feb. 10, 1995 as a continuation-in-part of application Ser. No. 08/248,289, filed May 24, 1994, discloses that microporous ceramics can be achieved without the need to include particulate material in the pre-ceramic composition by conducting the pyrolysis at a controlled rate of heating and under flowing ammonia gas and at maximum heating temperatures of less than about 1100° C., preferably less than 1000° C.

In copending U.S. application Ser. No. 08/579,444, filed on Dec. 27, 1995, microporous ceramic materials are disclosed which are prepared by first forming a composite intermediate comprising a colloidal dispersion of a preceramic precursor polymer mixed with discrete, nanoscale metal particles having a dimension of from about 10 to about 500 Angstroms and gradually heating the mixture in the presence of an inert or reactive gas to a temperature of about 300° C. up to less than 1100° C. to achieve a microporous ceramic having a surface area in excess of 70 m$^2$/gm and a volume of open pore micropores of greater than about 0.03 cm$^3$/gm. Similar microporous ceramic materials are also disclosed in allowed U.S. copending application Ser. No. 08/578,084, filed on Dec. 27, 1995, which are prepared by first forming a composite intermediate comprising a mixture of a preceramic precursor polymer and from about 0.5 up to about 65 wt % of an organometallic compound containing a metal of Group bI, II, III, IV, V, VIB, VIIA, or VIII of the Periodic Table, including Rare Earth metals, and gradually heating the mixture in the presence of a reactive or inert gas to a maximum temperature in the range of from about 300° C. up to less than 1200° C.

It is to be noted, however, in each of the applications discussed above, heating of the preceramic composition is conducted either in an inert gas or ammonia over the entire range of temperature from room temperature up to the maximum heating temperatures disclosed.

The preparation of porous ceramics particularly useful for membrane gas separation processes is disclosed by K. Kusakabe et al., "Preparation of Supported Composite Membrane By Pyrolysis of Polycarbosilane for Gas Separation at High Temperature", J. Membrane Sci. 103, 175–180 (1995). This reference describes the synthesis of a porous membrane structure by pyrolysis of polycarbosilane film, deposited from xylene solution onto a γ-alumina film on the outer surface of an α-alumina tube, and bulk porous material made by pyrolysis of polycarbosilane, formed by evaporating a xylene solution. After heating to 200° C. in air and holding at that temperature for one hour, pyrolysis was conducted by heating for two hours in nitrogen or air at a temperature in the range of 350° to 550° C., followed by cooling to room temperature. Data are shown indicating the pore sizes are between 20 Å and 100 Å. The reference does not specifically describe the preparation of porous ceramics having a significant content of micropore volume having pore dimensions of less than 20 Å (2 nanometers).

SUMMARY OF THE INVENTION

The present invention provides a process for preparing a nanoporous ceramic product having a surface area in excess of 70 m$^2$/gm and a volume of open-pore micropores, which have a mean diameter of less than 20 Angstroms, of greater than about 0.03 cm$^3$/gm, comprising: a) providing a composition consisting essentially of ceramic precursor oligomer or polymer material having a number average molecular weight in the range of from about 200 to about 100,000 g/mole; b) as an optional step, contacting said ceramic precursor composition with a crosslinking agent capable of undergoing addition or substitution reactions with back bone atoms present in said precursor material, while gradually heating said precursor to an intermediate temperature ($T_{int}$) in the range of about 100° C. to 400° C. and for a period of time sufficient to crosslink said precursor material; c) gradually heating said composition from step (a) or said crosslinked precursor material from step (b) in the presence of a flowing non-reactive inert gas or in a vacuum to a temperature in excess of 400° C. up to a maximum temperature ($T_{max}$) of about 650° C. to form said nanoporous ceramic product; and d) gradually cooling said nanoporous ceramic product. Said inert gas can be helium, argon, nitrogen or neon.

Preferred crosslinking agents used in optional step (b) are gases, solids or liquids having the structure H—R—H wherein R is a polyvalent radical selected from the group consisting of O, S, NH and functionalized organic radicals containing 1 to 40 carbon atoms.

The nanoporous ceramics prepared in accordance with this invention generally exhibit a surface area within the range of from about 70, preferably at least 100 and more preferably at least 200 up to about 600 m$^2$/gm based on the weight of the amorphous phase and amorphous phase micropore volumes of greater than 0.03, preferably greater than 0.05 and more preferably greater than 0.08, up to about 0.25 cm$^3$/g, wherein the volume fraction of micropores in the ceramic product ranges from about 8% to about 36%.

Ceramics produced in accordance with this invention are particularly useful as active materials in absorption, as active layers in membrane separation structures and as catalyst supports.

DETAILED DESCRIPTION OF THE INVENTION

The term "nanoporous" as used herein refers to open pore, amorphous, crosslinked ceramics having a porous structure wherein the pores have a mean width (diameter) of up to about 100 Angstroms. Inclusive within this definition are microporous ceramic structures having pores of mean width of about 2 to 20 Angstroms as well as supermicroporous ceramic structures with pore sizes of from above 20 up to 100 Angstroms. These terms are to be distinguished from the terms "mesoporous" which refers to pores having a mean width of up to about 500 Angstroms and "macroporous" which refers to pores having a mean width of 500 Angstroms or greater.

The nanoporous materials prepared in accordance with this invention will have a surface area in excess of 70 m$^2$/gram, more preferably in excess of 100 m$^2$/gram, even more preferably in excess of 200 m$^2$/gram and most preferably in excess of 300 m$^2$/gram. These materials also have a significant content of microporous, open pore structure, generally greater than 0.03 cm$^3$/gram, more preferably greater than 0.08 cm$^3$/gram and most preferably greater than 0.12 cm$^3$/gram.

The surface area and micropore volume are calculated from the nitrogen adsorption isotherm, which is measured at 77° K. using an automated continuous flow apparatus. The total surface area is calculated using the BET method, and the micropore volume and mesopore/macropore surface area are calculated using the T-plot method, as described in S. J. Gregg and K. S. W. Sing, "Adsorption, Surface Area and Porosity", Academic Press, New York, 1982; and S. Lowell and J. F. Shields, "Powder Surface Area and Porosity", Chapman and Hall, New York, 3rd Edition, 1984. Subtraction of the mesopore/macropore surface area from the total surface area gives an estimate of the micropore surface area.

Compositions which are pyrolyzed in accordance with this invention consist essentially of ceramic precursor oligomer or polymer materials having a number average molecular weight in the range of from about 200 to about 100,000 g/mole. The term "consisting essentially of" is meant to exclude from the composition other additives which can affect or influence the development of a microporous structure in the post-pyrolysis product, such as the additives described in the patent applications cited above, e.g., metal particles, as disclosed in Ser. No. 08/579,444 or fillers as disclosed in Ser. No. 08/248,290, now U.S. Pat. No. 5,643,987, and Ser. No. 08/248,291, now U.S. Pat. No. 5,563,212.

Ceramic precursor materials which are preferred for the purposes of this invention include oligomers and polymers such as polysilazanes, polycarbosilazanes, polycarbosilanes, vinylic polysilanes, amine boranes, polyphenylborazanes, carboranesiloxanes, polysilastyrene, polytitanocarbosilanes and like materials, as well as mixtures thereof, whose pyrolysis products yield ceramic compositions containing structural units having bond linkages selected from Si—C, Si—N, Si—C—N, Si—B, Si—B—N, Si—B—C, Si—C—N—B, B—N and B—N—C, as well as oxycarbide and oxynitride bond linkages such as Si—O—N and Ti—O—C. The preferred precursors are those oligomers and polymers having a number average molecular weight in the range of from about 200 to about 100,000 g/mole, more preferably from about 400 to about 20,000 g/mole. The chemistry of these oligomeric and polymeric precursors is further disclosed in the monograph "Inorganic Polymers", J. E. Mark, H. R. Allcock, and R. West, Prentice Hall, 1992.

Particularly preferred polysilazanes are those materials disclosed in U.S. Pat. Nos. 4,937,304 and 4,950,381, the complete disclosures of which are incorporated herein by reference. These materials contain, for example, recurring —Si(H) (CH$_3$)—NH— and —Si(CH$_3$)$_2$—NH— units and are prepared by reacting one or a mixture of monomers having the formula R$_1$SiHX$_2$ and R$_2$R$_3$SiX$_2$ in anhydrous solvent with ammonia. In the above formulas, R$_1$, R$_2$ and R$_3$ may be the same or different groups selected from hydrocarbyl, alkyl silyl or alkylamino and X is halogen. The preferred polysilazanes are prepared using methyldichlorosilane or a mixture of methyldichorosilane and dimethyldichlorosilane as monomer reactants with ammonia. The primary high temperature pyrolysis products (>1300° C.) of this precursor are silicon nitride (Si$_3$N$_4$) and silicon carbide (SiC). These precursors are commercially available from Chisso Corporation, Japan under the trade designations NCP-100 and NCP-200, and have a number average molecular weight of about 6300 and 1300 respectively.

Another class of polysilazane precursors are polyorgano (hydro)silazanes having units of the structure [(RSiHNH)$_x$ (R$_1$SiH)$_{1.5}$N]$_{1-x}$ where R$_1$ is the same or different hydrocarbyl, alkylsilyl, alkylamino or alkoxy and 0.4<X<1. These materials are disclosed in U.S. Pat. No. 4,659,850, the complete disclosure of which is incorporated herein by reference.

Another preferred ceramic precursor is a polysilastyrene having the structure [—(phenyl) (methyl)Si—Si (methyl)$_2$—]$_n$ available under the trade designation "Polysilastyrene-120" from Nippon Soda, Japan. This material has a number average molecular weight of about 2000 and the primary pyrolysis products of this precursor in an inert atmosphere are silicon carbide and carbon.

Other preferred ceramic precursors are polycarbosilanes having units of the structure (Si(CH$_3$)$_2$CH$_2$)$_n$ and/or (SiH (CH$_3$)CH$_2$)$_n$ having a number average molecular weight in the range of about 1000 to 7000. Suitable polycarbosilanes are available from Dow Corning under the trade designation PC-X9-6348 (Mn=1420 g/mol) and from Nippon Carbon of Japan under the trade designation PC-X9-6348 (Mn=1420 g/mol). The main pyrolysis product of these materials (>1300° C.) in an inert atmosphere are silicon carbide and excess carbon.

Vinylic polysilanes useful in this invention are available from Union Carbide Corporation under the trade designation Y-12044. These yield silicon carbide together with excess carbon as the main pyrolysis products in an inert atmosphere at elevated temperatures (>1300° C.).

Other suitable preceramic precursors will be evident to those skilled in the art, particularly those yielding SiC, Si$_3$N$_4$, Si—C—N, BN,Si—B—N, B$_4$C—BN—C and Si—B—C as pyrolysis products.

The nanoporous ceramics of the present invention may be prepared using a single step heating process (step c above) or a two step process wherein the precursor material is first subjected to a crosslinking step (step b above) followed by further heating in the presence of an inert gas or vacuum (step c above). In the pyrolysis heating step of the process (step c), the ceramic precursor is pyrolysed in an inert atmosphere or in a vacuum by gradually heating it to a temperature in excess of about 400° C. up to a maximum temperature (T$_{max}$) of about 600° C., or more preferably to a T$_{max}$ of about 425° to 625° C. and most preferably in the range of about 475° C. to 600° C. During this step, reactive groups present in the preceramic structure are decomposed and volatilized, thereby creating a microporous structure within the rigid preceramic polymer matrix. The rate of temperature increase is generally in the order of from about 1° to 7° C./min, more preferably less than about 5° C./min, and the process may include one or more holding periods at temperatures in the heating range between about 400° C. and 650° C., e.g., holding periods of about 30 minutes to 6 hours prior to cooling the microporous ceramic back to room temperature.

The heating step is carried out in the presence of flowing inert gas or in a vacuum. Preferred inert gases are selected from the group consisting of helium, argon, nitrogen and neon. The rate of gas flow through the sample undergoing pyrolysis may generally range from about 100 to 1000 cc/min.

A factor which influences the surface area and degree of microporosity is the maximum pyrolysis temperature (T$_{max}$) to which the ceramic is heated. Generally speaking, microporosity disappears or is diminished when T$_{max}$ is above about 650° C. For most preceramic polymers, the degree of microporosity tends to be at maximum levels for T$_{max}$ between about 475° C. and 600° C.

The nanoporous ceramics of the present invention may also be prepared using a two step heating process. In the first step (step b above), the preceramic precursor polymer is first contacted with or exposed to a reactive crosslinking agent capable of undergoing addition or substitution reactions with backbone atoms present in the precursor polymer, while gradually heating the precursor to an intermediate temperature (T$_{int}$) in the range of about 100° C. to 400° C. for a period of time sufficient to crosslink the precursor material. Crosslinking is reflected by an increase in viscosity, melting point and glass transition temperature (Tg) of the preceramic polymer, as well as the evolution of by-product species such as hydrogen, water and some organic decomposition products.

Suitable crosslinking agents are gaseous compounds or compounds which may be liquid or solid at temperatures above 100° C. Preferred compounds have the general structure H—R—H wherein R is a polyvalent radical selected from the group consisting of O,S,NH and functionalized organic radicals containing 1 to 40 carbon atoms, i.e., organic radicals containing at least two reactive functionalized groups. Suitable compounds include water (R is O); ammonia (R is NH); hydrogen sulfide (R is S); as well as organic compounds such as urea (R is HNCONH), C$_2$–C$_{40}$ aliphatic, cycloaliphatic or aromatic polyols such as ethylene glycol, glycerol, polyalkylene glycols and polyester diols; polyamines such as ethylene diamine or hexamethylenediamine; and like compounds which are reactive with hydrogen bonded to silicon (Si—H) or hydrogen bonded to metal atoms (Me—H), e.g., Al—H, B—H or Ti—H, which are present in or which develop in the preceramic polymer matrix during the initial heating step. It is believed that the resulting crosslinking reaction leads to the substitution of hydrogen with nitrogen, oxygen or R radicals, thereby forming Si—N—Si, Si—O—Si, Si—R—Si, Me—N—Me, Me—O—Me, or Me—R—Me bond linkages throughout the crosslinked polymer network, although other crosslinking mechanisms may also be involved. In addition, the selection of the R chain length within the 1–40 carbon atom range allows one to control the size of the micropores developed during the second heating stage because of the template effect of the R linkage.

Where the crosslinking agent is in the form of a gas or vapor at temperatures of about 100° C., e.g. ammonia or water (steam), contact of the crosslinking agent with the preceramic polymer may be accomplished by passing the flowing gas or vapor continuously over or through the preceramic during at least a portion of the first heating step. Generally speaking, gas or vapor flow rates in the range of about 25 to 1000 CC/min are sufficient to develop the desired crosslinked preceramic material. Prior to the crosslinking step or the pyrolysis step, the preceramic polymer may be dissolved in an organic solvent, e.g. toluene or xylene, formed into mixtures with other polymers or formed into coatings or membranes as described below. The solvent may then be evaporated away.

Where the crosslinking agent is in the form of a liquid or solid at temperatures above 100° C., contact of the preceramic polymer and crosslinking agent may be accomplished by forming a mixture of the preceramic polymer and crosslinking agent prior to the first heating step. Generally, the crosslinking agent is mixed with the preceramic polymer at a weight ratio such that the mixture contains from about 0.5 to about 30 wt % of crosslinking agent, based on the combined weight of preceramic polymer and crosslinking agent.

Mixing may be accomplished by any process which will ensure a uniform dispersion of the crosslinking agent in the ceramic precursor matrix. Thus the components may be ground, ball milled or pulverized together in dry form to form a fine powder mixture, or mixed in dry form and heated to a temperature sufficient to form a melt mixture, which melt mixture may then be cooled and pulverized. The melt may also be used directly to form crosslinked molded shapes or membrane films which are then pyrolyzed as hereafter described to form ceramic shaped articles. Alternatively, the precursor oligomer or polymer, including the optional crosslinking agent, may be dissolved in an organic solvent in which the components are soluble, e.g., toluene or xylene, followed by removal of the solvent by evaporation and by grinding the resultant dry product into a fine powder. A solvent solution may also be used directly to form shaped articles by permitting it to gel into a shaped form or by application to substrates and evaporation of the solvent to form a thin film or membrane.

Prior to pyrolysis, the preceramic polymer composition may be formed into any desired shape such as a pellet, disc, fiber, thin membrane, membrane layer or other three dimensional shape. The dry precursor may be shaped using an extruder or a hydraulic press, with or without heat being applied, or by conducting the pyrolysis in a suitable mold cavity containing the preceramic polymer composition. Fibers may be prepared by extruding or spinning a melt or solution of the composition. Pellets may be formed by chopping the fibers as they emerge from the extruder or spinning die. Thin separation membranes may be formed by applying a melt or solution of the composition to the surface of a suitable substrate, such as another ceramic, and subjecting the structure to well known spin or whirl coating techniques to form a uniform, thin coating of the composition on the surface of the substrate, followed by heating to evaporate the solvent where solvent is present.

In the preferred embodiment, the optional crosslinking step (step b) is conducted by gradually heating the precursor polymer composition in a furnace at a controlled rate of temperature increase to an intermediate temperature ($T_{int}$) of up to 400° C., more preferably up to about 350° C., and most preferably in the range of from about 200° to 350° C. As in the case of heating step c, the rate of temperature increase is generally in the order of from about 1° to 7° C./min, more preferably less than about 5° C./min. The crosslinking step may also include one or more holding periods at temperatures below $T_{int}$ for periods of from about 30 minutes to 6 hours. It is also preferred to include a hold time of from about 30 minutes to 6 hours at $T_{int}$ prior to subjecting the crosslinked precursor polymer composition to the subsequent pyrolysis step at higher temperatures.

Where the crosslinking agent is in gaseous or vapor form, it may be passed through or over the precursor composition either neat or in combination with an inert gas such as helium. The degree of crosslinking may be further controlled by varying the relative ratio of active gas or vapor and inert gas. Where a reactive gas such as ammonia or water vapor is used in the crosslinking step, flow of that gas is discontinued after the crosslinking step is completed, and the inert gas or vacuum is employed for the pyrolysis step.

Ceramic precursor polymers pyrolyzed in accordance with this invention generally exhibit a post-pyrolysis ceramic yield of at least about 50% by weight of the weight of the starting precursor, more preferably at least 65% by weight.

Pyrolysis in an inert atmosphere at temperatures of less than or equal to 650° C., with or without an intermediate step in the presence of a crosslinking agent, provides a significant advantage over previous methods using higher temperatures and/or reactive atmospheres. This allows pyrolysis of the preceramic polymer intermediate in conjunction or in contact with a membrane or separation support structure (metal, ceramic or composite) which membrane or structure might be adversely affected by exposure to a reactive atmosphere at the higher temperature range of up to 650° C.

Advantageous uses of these microporous materials and structures include sorption, separation, reactive separation and chemical and environmental sensors.

A suitable apparatus which may be used for both the pyrolysis and optional crosslinking steps is an electrically heated furnace with an internal metal retort into which the reagents, in ceramic crucibles, are placed. Standard metal fittings to the retort provide an inlet for the gases used, and an outlet for spent gases and reaction products. The time-temperature profile is controlled by a computer and the temperature in the retort is measured by a thermocouple in a metal sheath.

The following examples are illustrative of the invention. As used in the examples and tables, the following designations have the following meanings:

NCP-100—A polysilazane polymer available from the Chisso Corporation of Japan having a number average molecular weight of about 6300 g/mole and a melting point of about 200° C.

NCP-200—A polysilazane polymer available from the Chisso Corporation of Japan having a number average molecular weight of about 1300 g/mole and a melting point of about 100° C.

PCS—A polycarbosilane preceramic polymer available from Nippon Carbon Company of Japan (U.S. distribution Dow Chemical Company) having a number average molecular weight of about 2000 g/mole and a melting point of about 100° C.

PSS-100—A polysilastyrene polymer available from Nippon Soda, Japan having a number average molecular weight of about 2000.

EXAMPLES

Starting samples (3–6 grams each) of preceramic polymers as shown in Table 1 were placed in an aluminum oxide boat, inserted in the steel liner of a heat treating furnace and initially purged with the activation gas described in the Table for about 30 minutes. The samples were then heated under the conditions set forth in the Table under a flow of the indicated activation gas (flow rate about 300–1000 cc/min). Each sample was then further heated under the stated pyrolysis conditions using helium as the inert pyrolysis gas.

The resulting ceramic product in each case was weighed and a nitrogen absorption isotherm was determined, and analyzed by the BET method to obtain the surface area, and by the t-plot method to obtain the micropore volume and meso/macro surface area. The micropore volume, total surface area and surface area due to mesopores and/or macropores for each sample are listed in Table 1. The surface area associated with microporosity is approximately equal to the difference in column 8 and column 9. The % weight loss for some samples was also obtained by weighing the sample before and after pyrolysis.

The Std. t-T referred to in Table 1-A for control sample JA20-1 is as follows: Flow of He for 30 minutes at room temperature (ca. 30° C.); 60 minutes heat to 200° C.; 240 minutes heat at 200° C.; 120 minutes heat to 300° C.; 300 minutes heat at 300° C.; 120 minutes heat to 400° C.; 300 minutes heat at 400° C.; 120 minutes heat to 500° C.; 120 minutes heat at 500° C.; 120 minutes heat to 700° C.; 120 minutes heat at 700° C.; cool to room temperature in flowing helium gas. Modifications of this procedure where used are indicated in Tables 1-A through 1-F.

The legend "xylene ev. or xylene evap." in the Tables refers to the process where the preceramic polymer is dissolved in xylene to form a 30–50 wt % solution, followed by evaporation of the solvent. Residue is pulverized to form a powder prior to heat treatments.

In the activated pyrolysis of preceramic polymers described in Tables 1-A through 1-G, samples of polysilazane and polycarbosilane preceramic polymers were activated by treating them with crosslinking molecules, specifically $NH_3$ and $H_2O$, at an intermediate temperature, typically 200°–300° C., and then heated to a higher maximum temperature, typically 425°–700° C., in an inert atmosphere, He. Prior to the activation treatment, in some cases the preceramic polymer was first dissolved in xylene and evaporated in air. In other cases, the preceramic polymer was used as supplied from the manufacturer. Tables 1-H and 1-I show pyrolysis results using helium as the pyrolysis gas and without pre-treatment with a crosslinking gas.

As shown in the control Sample JA20-1, heating, of the polysilazane preceramic polymer NCP-200 in He atmosphere using the heating schedule indicated, with final temperature 700° C., resulted in a low surface area material (7 $m^2$/gm). In marked contrast, considerable microporosity and higher surface area were developed in the NCP-200 preceramic polymer pyrolyzed in He atmosphere where $T_{max}$ was within the range of 425°–625° C. as shown in samples JA36-1, JA37-1, JB21-1 and JB22-1 of Tables 1-H and 1-I.

Tests results for samples JA24-1, JA24-2, JMT1-5, JMT1-6 and JMT1-7 are reproduced in Table 1-B for comparative purposes, and results for samples JA26-1, JA26-2 and JA26-3 are reproduced in Tables 1-D, 1-E and 1-F also for comparative purposes.

As shown for $NH_3$ activation in Table 1, sample JA22-1, obtained by activating the polysilazane preceramic polymer NCP-200 (as received) at an intermediate temperature of 200° C. for four hours, followed by pyrolysis at 7000° C. in He atmosphere, resulted in a microporous material of only moderate surface area. The JA22-2 sample, obtained by activating the polycarbosilane preceramic polymer PCS (as received) under the same conditions of reaction and pyrolysis resulted in a non-microporous material. Samples JA24-1 and JA24-2, processed under the same conditions as JA22-1 and JA22-2, but heated to $T_{max}$ of 550° C., became highly microporous with surface areas of 374 & 507 $m^2$/gm and micropore volumes of 0.1570 and 0.2085 cc/gm respectively.

To further test the effect of the temperature and time of activation, samples JA26-1,2,3 were run using an additional time of activation in $NH_3$ at 300° C. in addition to the time at 200° C. The surface area of sample JA26-1 using NCP-200 evaporated from xylene, was increased to 473 $m^2$/gm, and the micropore volume increased to 0.2033/ccgm. Significantly, Sample JA26-3, using as received NCP-200, had almost the same surface area and micropore volume as Sample JA26-1, indicating that the initial step of dissolving and evaporating the NCP-200 from xylene has little effect. Sample JA26-2, made from PCS evaporated from xylene, showed reduced surface area and micropore volume by about 30% compared to the sample JA24-2 activated only at 200° C.

As shown in Table 1-G, for activation of NCP-200 and PCS using an atmosphere of He saturated with $H_2O$ (50° C.) vapor by passing it through a bubbler, microporous materials were obtained by activation at intermediate temperatures of 200° or 300° C., followed by heating to a maximum temperature of 500° C. or 550° C.

TABLE 1-A

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2$/gm | Mes/Macr Surface Area $m^2$gm | MPV cc/gm | WT. % Loss |
|---|---|---|---|---|---|---|---|---|---|---|---|
| JA20-1 | NCP-200 (as received) | He (i.e. none) | NA | Std. t-T | He | 700° C. | Std. t-T | 7.3 | 7.3 | — | 36.5 |
| JA22-1 | NCP-200 (as received) | $NH_3$ | 200° C. | 60 min. RT–200° C., 240 min at 200° C. | He | 700° C. | 240 min to 700° C., 120 min hold, cool | 136 | 35 | 0.0554 | 37.9 |
| JA22-2 | PCS (as received) | $NH_3$ | 200° C. | 60 min. RT–200° C., 240 min at 200° C. | He | 700° C. | 240 min to 700° C., 120 min hold, cool | 3.5 | 3.5 | — | 37.2 |

TABLE 1-A-continued

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2/gm$ | Mes/Macr Surface Area $m^2gm$ | MPV cc/gm | WT. % Loss |
|---|---|---|---|---|---|---|---|---|---|---|---|
| JA29-1* | NCP-200 (as rec.) | $NH_3$ | 200° C. | 60 min. RT–200° C., 240 min at 200° C. | He | 550° C. | 168 min to 550° C., 120 min hold, cool | 470 | 19 | 0.2043 | 34.1 |
| JA29-2* | PCS (as rec.) | $NH_3$ | 200° C. | 60 min. RT–200° C., 240 min at 200° C. | He | 550° C. | 168 min to 550° C., 120 min hold, cool | 410 | 98 | 0.1252 | 26.7 |
| JA24-1 | NCP-200 (Xylene ev.) | $NH_3$ | 200° C. | 60 min. RT–200° C., 240 min at 200° C. | He | 550° C. | 148 min to 550° C., 240 min hold, cool | 374 | 24 | 0.1570 | 32.1 |
| JA24-2 | PCS (Xylene ev.) | $NH_3$ | 200° C. | 60 min. RT–200° C., 240 min at 200° C. | He | 550° C. | 148 min to 550° C., 240 min hold, cool | 507 | 16 | 0.2085 | 32.6 |
| JA30-1# | NCP-200 (As rec.) | $NH_3$ | 200° C. | 60 min. RT–200° C., 240 min at 200° C. | He | 550° C. | 148 min to 550° C., 240 min hold, cool | 476 | 95 | 0.1586 | 36.8 |
| JA30-2# | NCP-200 (Xylene ev.) | $NH_3$ | 200° C. | 60 min. RT–200° C., 240 min at 200° C. | He | 550° C. | 148 min to 550° C., 240 min hold, cool | 495 | 98 | 0.1639 | 33.6 |
| JA30-3# | PCS (As rec.) | $NH_3$ | 200° C. | 60 min. RT–200° C., 240 min at 200° C. | He | 550° C. | 148 min to 550° C., 240 min hold, cool | 541 | 147 | 0.1636 | 28.3 |
| JA30-4# | PCS (Xylene ev.) | $NH_3$ | 200° C. | 60 min. RT–200° C., 240 min at 200° C. | He | 550° C. | 148 min to 550° C., 240 min hold, cool | 536 | 154 | 0.1575 | 33.7 |
| JMT1-5@ | NCP-200 (As rec.) | $NH_3$ | 200° C. | 240 min. RT–200° C., 240 min at 200° C. | He | 550° C. | 525 min to 550° C., 240 min hold, cool | 496 | 82 | 0.1633 | 26.1 |
| JMT1-6@ | NCP-200 (Xylene ev.) | $NH_3$ | 200° C. | 240 min. RT–200° C., 240 min at 200° C. | He | 550° C. | 525 min to 550° C., 240 min hold, cool | 525 | 84 | 0.1754 | 32.0 |
| JMT1-7@ | PCS (As rec.) | $NH_3$ | 200° C. | 240 min. RT–200° C., 240 min at 200° C. | He | 550° C. | 525 min to 550° C., 240 min hold, cool | 546 | 94 | 0.1793 | 28.3 |

*Moditication of JA22 with $T_{max}$ 550° C. instead of 700° C.
Repeat of JA24
@Modification of JA24 with heating rates decreased from 2.83° C./min to 0.67° C./min at same $T_{max}$ 550° C.

TABLE 1-B

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2/gm$ | Mes/Macr Surface Area $m^2gm$ | Micro pore Volume cc/gm | WT. % Loss |
|---|---|---|---|---|---|---|---|---|---|---|---|
| JA24-1 | NCP-200 (Xylene ev.) | $NH_3$ | 200° C. | 60 min. RT–200° C., 240 min at 200° C. | He | 550° C. | 148 min to 550° C., 240 min hold, cool | 374 | 24 | 0.1570 | 32.1 |
| JA24-2 | PCS (Xylene ev.) | $NH_3$ | 200° C. | 60 min. RT–200° C., 240 min at 200° C. | He | 550° C. | 148 min to 550° C., 240 min hold, cool | 507 | 16 | 0.2085 | 32.6 |
| JMT1-5* | NCP-200 (As rec.) | $NH_3$ | 200° C. | 240 min. RT–200° C., 240 min at 200° C. | He | 550° C. | 525 min to 550° C., 240 min hold, cool | 496 | 82 | 0.1633 | 26.1 |
| JMT1-6* | NCP-200 (Xylene ev.) | $NH_3$ | 200° C. | 240 min. RT–200° C., 240 min at 200° C. | He | 550° C. | 525 min to 550° C., 240 min hold, cool | 525 | 84 | 0.1754 | 32.0 |
| JMT1-7* | PCS (As rec.) | $NH_3$ | 200° C. | 240 min. RT–200° C., 240 min at 200° C. | He | 550° C. | 525 min to 550° C., 240 min hold, cool | 546 | 94 | 0.1793 | 28.3 |
| JA31-1@ | NCP-200 (As rec.) | $NH_3$ | 200° C. | 240 min. RT–200° C., 240 min at 200° C. | He | 625° C. | 634 min to 625° C., 240 min hold, cool | 317 | 13 | 0.1259 | 38.5 |
| JA31-2@ | PCS (As rec.) | $NH_3$ | 200° C. | 240 min. RT–200° C., 240 min at 200° C. | He | 625° C. | 634 min to 625° C., 240 min hold, cool | 56 | 27 | 0.0151 | 31.9 |
| JB18-1# | NCP-200 (As rec.) | $NH_3$ | 200° C. | 240 min. RT–200° C., 240 min at 200° C. | He | 425° C. | 336 min to 425° C., 240 min hold, cool | 131 | 135 | 0.02 | 30.9 |
| JB18-2# | PCS (As rec.) | $NH_3$ | 200° C. | 240 min. RT–200° C., 240 min at 200° C. | He | 425° C. | 336 min to 425° C., 240 min hold, cool | 2 | 2 | 0 | 18.5 |

*Moditication of JA22 with $T_{max}$ 550° C. instead of 700° C.
Repeat of JA24
@Modification of JA24 with heating rates decreased from 2.83° C./min to 0.67° C./min at same $T_{max}$ 550° C.

TABLE 1-C

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2/gm$ | Mes/Macr Surface Area $m^2gm$ | Micro pore Volume cc/gm | WT. % Loss |
|---|---|---|---|---|---|---|---|---|---|---|---|
| JA 26-1 | NCP-200 (Xylene ev.) | $NH_3$ | 300° C. | 60 min. RT–200° C., 240-min hold at 200° C.; 35 min to 300° C., 120 min hold at 300° C. | He | 550° C. 2.38°/m | 105 min to 550° C., 240 min at 550° C., cool | 473 | 20 | 0.2033 | 25.4 |
| JB 26-2 | PCS (Xylene ev.) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 358 | 22 | 0.1553 | 36.5 |

TABLE 1-C-continued

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2/gm$ | Mes/Macr Surface Area $m^2gm$ | Micro pore Volume cc/gm | WT. % Loss |
|---|---|---|---|---|---|---|---|---|---|---|---|
| JB26-3 | NCP-200 (as received) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 492 | 17 | 0.2075 | 22.0 |
| JB17-1[@] | NCP-200 (as received) | $NH_3$ | 300° C. | 60 min RT–200° C. 240-min hold at 200° C.; 35 min to 300° C., 120 min hold at 300° C. | He | 700° C. | 152 min to 700° C., 240 min at 700° C., cool | 8 | 8 | 0 | 42.0 |
| JB17-2 | NCP-200 (Xylene evap.) | $NH_3$ | 300° C. | 60 min RT–200° C. 240-min hold at 200° C.; 35 min to 300° C., 120 min hold at 300° C. | He | 700° C. | 152 min to 700° C., 240 min at 700° C., cool | 91 | 91 | 0 | 33.4 |
| JB17-3 | PCS (As rec.) | $NH_3$ | 300° C. | 60 min RT–200° C. 240-min hold at 200° C.; 35 min to 300° C., 120 min hold at 300° C. | He | 700° C. | 152 min to 700° C., 240 min at 700° C., cool | 5 | 5 | 0 | 45.6 |
| JB17-4 | PCS (Xylene ev.) | $NH_3$ | 300° C. | 60 min RT–200° C. 240-min hold at 200° C.; 35 min to 300° C., 120 min hold at 300° C. | He | 700° C. | 152 min to 700° C., 240 min at 700° C., cool | 24 | 10 | 0.0058 | 56.6 |

[@]Modification of JA26 to $T_{max}$ = 700° C. instead of 550° C., and 2.63° C./min instead of 2.38° C./min

TABLE 1-D

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2/gm$ | Mes/Macr Surface Area $m^2gm$ | Micro pore Volume cc/gm | WT. % Loss |
|---|---|---|---|---|---|---|---|---|---|---|---|
| JA 26-1 | NCP-200 (Xylene ev.) | $NH_3$ | 300° C. | 60 min. RT–200° C., 240-min hold at 200° C.; 35 min to 300° C., 120 min hold at 300° C. | He | 550° C. | 105 min to 550° C., 240 min at 550° C., cool | 473 | 20 | 0.2033 | 25.4 |
| JB 26-2 | PCS (Xylene ev.) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 358 | 22 | 0.1553 | 36.5 |
| JB26-3 | NCP-200 (as received) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 492 | 17 | 0.2075 | 22.0 |
| JMT2-1[@] | NCP-200 (as received) | $NH_3$ | 300° C. | 240 min RT–200° C. 240-min hold at 200° C.; 35 min to 300° C., 120 min hold at 300° C. | He | 700° C. | 105 min to 550° C., 240 min at 550° C., 60 min at 700° C., 120 min hold at 700° C., cool | 56 | 30 | 0.0134 | 27.7 |
| JMT2-2 | NCP-200 (Xylene evap.) | $NH_3$ | 300° C. | 60 min RT–200° C. 240-min hold at 200° C.; 35 min to 300° C., 120 min hold at 300° C. | He | 700° C. | 105 min to 550° C., 240 min at 550° C., 60 min at 700° C., 120 min hold at 700° C., cool | 2 | 2 | — | 30.2 |
| JMT2-3 | PCS (As rec.) | $NH_3$ | 300° C. | 60 min RT–200° C. 240-min hold at 200° C.; 35 min to 300° C., 120 min hold at 300° C. | He | 700° C. | 105 min to 550° C., 240 min at 550° C., 60 min at 700° C., 120 min hold at 700° C., cool | 2 | 2 | — | 33.2 |
| JMT2-4 | PCS (Xylene ev.) | $NH_3$ | 300° C. | 60 min RT–200° C. 240-min hold at 200° C.; 35 min to 300° C., 120 min hold at 300° C. | He | 700° C. | 105 min to 550° C., 240 min at 550° C., 60 min at 700° C., 120 min hold at 700° C., cool | 2 | 2 | — | 39.4 |

[@]Modification of JA26 to $T_{max}$ = 700° C. instead of 550° C., and 2.63° C./min instead of 2.38° C./min

TABLE 1-E

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2$/gm | Mes/Macr Surface Area $m^2$gm | Micro pore Volume cc/gm | WT. % Loss |
|---|---|---|---|---|---|---|---|---|---|---|---|
| JA 26-1 | NCP-200 (Xylene ev.) | $NH_3$ | 300° C. | 60 min. RT–200° C., 240-min hold at 200° C.; 35 min to 300° C., 120 min hold at 300° C. | He | 550° C. | 105 min to 550° C., 240 min at 550° C., cool | 473 | 20 | 0.2033 | 25.4 |
| JB 26-2 | PCS (Xylene ev.) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 358 | 22 | 0.1553 | 36.5 |
| JB26-3 | NCP-200 (as received) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 492 | 17 | 0.2075 | 22.0 |
| JB19-1@ | NCP-200 (as received) | $NH_3$ | 300° C. | 240 min RT–200° C. 240-min hold at 200° C.; 140 min to 300° C., 120 min hold at 300° C. | He | 425° C. | 176 min to 425° C., 240 min at 425° C., cool | 240 | 122 | 0.0833 | 34.7 |
| JB19-2 | PCS (As rec.) | $NH_3$ | 300° C. | 240 min RT–200° C. 240-min hold at 200° C.; 140 min to 300° C., 120 min hold at 300° C. | He | 425° C. | 176 min to 425° C., 240 min at 425° C., cool | 4 | 4 | 0 | 17.6 |
| JA32-1# | NCP-200 (as received) | $NH_3$ | 300° C. | 240 min RT–200° C. 240-min hold at 200° C.; 140 min to 300° C., 120 min hold at 300° C. | He | 625° C. | 458 min to 625° C., 240 min at 625° C., cool | 350 | 30 | 0.1388 | 38.6 |
| JA32-2 | PCS (As rec.) | $NH_3$ | 300° C. | 240 min RT–200° C. 240-min hold at 200° C.; 140 min to 300° C., 120 min hold at 300° C. | He | 625° C. | 458 min to 625° C., 240 min at 625° C., cool | 340 | 68 | 0.1097 | 31.4 |

@Modification of JA26 to heating rates of 0.71° C./min and to $T_{max}$ = 425° C. instead of 550° C.
Modification of JA26 to heating rates of 0.71° C./min and to $T_{max}$ = 625° C. instead of 550° C.

TABLE 1-F

| Sample # | Preceramic Polymer | Act. Gas | $T_{max}$ Act. | Activation Time/Temperature Schedule | Pyrol. Gas | $T_{max}$ Pyrol. | Pyrolysis Time/Temperature Schedule | Total Surface Area $m^2$/gm | Mes/Macr Surface Area $m^2$gm | Micro pore Volume cc/gm | WT. % Loss |
|---|---|---|---|---|---|---|---|---|---|---|---|
| JA 26-1 | NCP-200 (Xylene ev.) | $NH_3$ | 300° C. | 60 min. RT–200° C., 240-min hold at 200° C.; 35 min to 300° C., 120 min hold at 300° C. | He | 550° C. | 105 min to 550° C., 240 min at 550° C., cool | 473 | 20 | 0.2033 | 25.4 |
| JB 26-2 | PCS (Xylene ev.) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 358 | 22 | 0.1553 | 36.5 |
| JB26-3 | NCP-200 (as received) | $NH_3$ | 300° C. | 60 min RT–200° C. 240-min hold at 200° C.; 35 min to 300° C., 120 min hold at 300° C. | He | 550° C. | 105 min to 550° C., 240 min at 550° C., cool | 492 | 17 | 0.2075 | 22.0 |
| JB20-1@ | NCP-200 + 20% Claytone HT + 10% propylene carbonate# | $NH_3$ | 300° C. | 240 min RT–200° C. 240-min hold at 200° C.; 140 min to 300° C., 120 min hold at 300° C. | He | 500° C. | 246 min to 500° C., 240 min at 500° C., cool | 466 | 17 | 0.2012 | 32.4 |
| JB20-2@ | PCS +20% Claytone HT + 10% propylene carbonate# | $NH_3$ | 300° C. | 240 min RT–200° C. 240-min hold at 200° C.; 140 min to 300° C., 120 min hold at 300° C. | He | 500° C. | 246 min to 500° C., 240 min at 500° C., cool | 282 | 58 | 0.1247 | 7.7 |
| JB20-3@ | NCP-200 (as received) | $NH_3$ | 300° C. | 240 min RT–200° C. 240-min hold at 200° C.; 140 min to 300° C., 120 min hold at 300° C. | He | 500° C. | 246 min to 475° C., 240 min at 475° C., cool | 506 | 41 | 0.2109 | 25.0 |
| JB20-4@ | PCS (As rec.) | $NH_3$ | 300° C. | 240 min RT–200° C. 240-min hold at 200° C.; 140 min to 300° C., 120 min hold at 300° C. | He | 500° C. | 246 min to 500° C., 240 min at 500° C., cool | 550 | 59 | 0.008 | 24.1 |

@Modification of JA26 to heating rate = 0.71° C./min and to $T_{max}$ = 550° C.
Mixed in 10 cc xylene, sonicated, dried in vacuum oven at 130° C.

TABLE 1-G

| Sample # | Preceramic Polymer | Activation Gas | $T_{max}$ Activation | Activation Time/ Temperature | Pyrolysis Gas | $T_{max}$ Pyrolysis | Pyrolysis Time/ Temperature | Total Surface Area $m^2/gm$ | Mes/Macr Surface Area $m^2 gm$ | Micro pore Volume cc/gm | WT. % Loss |
|---|---|---|---|---|---|---|---|---|---|---|---|
| JA27-1 | NCP-200 (as received) | He saturated $H_2O$, 50° C. | 200° C. | 60 min. to 200 ° C., 120 minutes at 200° C. | He | 550° C. | 148 min to 550° C., 240 min hold, cool | 517 | 28 | 0.2189 | 31.7 |
| JA27-2 | NCP-200 (Xylene evap.) | He saturated $H_2O$, 50° C. | 200° C. | 60 minutes to 200° C., 120 minutes at 200° C. | He | 550° C. | 148 min to 550° C., 240 min hold, cool | 406 | 36 | 0.1702 | 31.5 |
| JA27-3 | PCS (Xylene evap.) | He saturated $H_2O$, 50° C. | 200° C. | 60 minutes to 200° C., 120 minutes at 200° C. | He | 550° C., | 148 min to 550° C., 240 min hold, cool | 566 | 44 | 0.2375 | 33.3 |
| JA33-2 | NCP-200 (as received) | He/$H_2O$, sat-50° C. | 200° C. 1.42° C./min | 120 m. to 200° C., 120 m. at 200° C. | He | 700° C. 2.00° C./min | 250 min to 700° C., 240 min hold, cool | 2 | 2 | 0 | 24.7 |
| JA33-2 | PCS (as received) | He/$H_2O$, sat-50° C. | 200° C. 1.42° C./min | 120 m. to 200° C., 120 m. at 200° C. | He | 700° C. 2.00° C./min | 250 min to 700° C., 240 min hold, cool | 2 | 2 | 0 | 11.7 |
| JA34-1 | NCP-200 (as received) | He/$H_2O$, sat-50° C. | 200° C. 1.42° C./min Plus 300° C. 0.83° C./min | 120 m. to 200° C., 120 m. at 200° C. 120 m. to 300° C., 120 m. at 300° C. | He | 500° C. 0.71° C./min | 280 min to 500° C., 240 min hold, cool | 478 | 46 | 0.2050 | 28.7 |
| JA34-2 | PCS (as received) | He/$H_2O$, sat-50° C. | 200° C. 1.42° C./min Plus 300° C. 0.83° C./min | 120 m. to 200° C., 120 m. at 200° C. 120 m. to 300° C., 120 m. at 300° C. | He | 500° C. 0.71° C./min | 280 min to 500° C., 240 min hold, cool | 200 | 104 | 0.0712 | 26.4 |

TABLE 1-H

| Sample # | Preceramic Polymer | Activation Gas | $T_{max}$ Activation | Activation Time/ Temperature | Pyrolysis Gas | $T_{max}$ Pyrolysis | Pyrolysis Time/ Temperature | Total Surface Area $m^2/gm$ | Mes/Macr Surface Area $m^2 gm$ | Micro pore Volume cc/gm |
|---|---|---|---|---|---|---|---|---|---|---|
| JA35-1 | NCP-200 | He | 300° C. 2.83°/m, 2.86°/m 60 min RT– 200° C., 240-min hold at 200° C. | 60 min. to 300+ C., 120 min hold at 300° C. | He | 550° C. 2.38°/m | 105 min to 550° C., 240 min at 550° C., cool | 509 | 94 | 0.173 |
| JA35-2 | NCP-100 | He | same | same | He | 550° C. | same | 786 | 119 | 0.2801 |
| JA35-3 | PCS | He | same | same | He | 550° C. | same | 548 | 142 | 0.1672 |
| JA35-4 | PSS-100 | He | same | same | He | 550° C. | same | 409 | 267 | 0.0553 |
| JA36-1 | NCP-200 | He | N/A | N/A | He | 550° C. | 10° C./min. 4 hr hold at $T_{max}$ | 475 | 21 | 0.2036 |
| JA36-2 | NCP-100 | He | N/A | N/A | He | 550° C. | 10° C./min. 4 hr hold at $T_{max}$ | 394 | 12 | 0.1649 |
| JA36-3 | PCS | He | N/A | N/A | He | 550° C. | 10° C./min. 4 hr hold at $T_{max}$ | 5352 | 30 | 0.2282 |
| JA36-4 | PSS-100 | He | N/A | N/A | He | 550° C. | 10° C./min. 4 hr hold at $T_{max}$ | 444 | 20 | 0.1928 |
| JA37-1 | NCP-200 | He | N/A | N/A | He | 625° C. 2.00° C./min | held 4 hr | 364 | 59 | 0.1186 |
| JA37-2 | NCP-100 | He | N/A | N/A | He | 625° C. 2.00° C./min | same | 197 | 114 | 0.0362 |
| JA37-3 | PCS | He | N/A | N/A | He | 625° C. 2.00° C./min | same | 206 | 161 | 0.0149 |
| JA37-4 | PSS-100 | He | N/A | N/A | He | 625° C. 2.00° C./min | same | 13 | 41 | 0 |

TABLE 1-I

| Sample # | Preceramic Polymer | Activation Gas | $T_{max}$ Activation | Activation Time/ Temperature | Pyrolysis Gas | $T_{max}$ Pyrolysis | Pyrolysis Time/ Temperature | Total Surface Area $m^2$/gm | Mes/Macr Surface Area $m^2$gm | Micro pore Volume cc/gm |
|---|---|---|---|---|---|---|---|---|---|---|
| JB-21-1 | NCP-200 | | 0.17° C./min | 4 hr hold at 200° C. 2 hr hold at 300° C. | He | 500° C. 0.71° C./min | held 4 hr at $T_{max}$ | 545 | 143 | .1627 |
| JB-21-2 | NCP-100 | | | | He | 500° C. 0.71° C./min | | 485 | 103 | .1530 |
| JB-21-3 | PCS | | | | He | 500° C. 0.71° C./min | | 106 | — | — |
| JB-21-4 | PSS-100 | | | | He | 500° C. 0.71° C./min | | 232 | 163 | .0272 |
| JB-22-1 | NCP-200 | | 0.67° C./min | 4 hr hold at 200° C. 2 hr hold at 300° C. | He | 425° C. 0.71° C./min | | 133 | 125 | .0390 |
| JB-22-2 | NCP-100 | | | | He | 425° C. 0.71° C./min | | 435 | 45 | .1864 |
| JB-22-3 | PCS | | | | He | 425° C. 0.71° C./min | | 5 | 4 | .0011 |
| JB-22-4 | PSS-100 | | | | He | 425° C. 0.71° C./min | | 23 | 23 | .0047 |
| JA38-1 | NCP-200 | | | | He | 650° C. 2.00° C./min | | 86 | 14 | 0.0377 |
| JA38-2 | NCP-100 | | | | He | 650° C. 2.00° C./min | | 29 | 9 | 0.0114 |
| JA38-3 | PCS | | | | He | 650° C. 2.00° C./min | | <1 | — | — |
| JA38-4 | PSS-100 | | | | He | 650° C. 2.00° C./min | | <1 | — | — |

What is claimed is:

1. A process for preparing a nanoporous ceramic product having a surface area in excess of 70 $m^2$gm and a volume of open-pore micropores, which have a mean diameter of 2 to 20 Angstroms, of greater than about 0.03 $cm^3$/gm comprising:
    a) providing a composition consisting essentially of ceramic precursor oligomer or polymer material having a number average molecular weight in the range of from about 200 to about 100,000 g/mole;
    b) contacting said ceramic precursor composition with a crosslinking agent capable of undergoing addition or substitution reactions with the backbone atoms present in said precursor material, while gradually heating said precursor to an intermediate temperature ($T_{int}$) in the range of about 100° C. to 400° C. and for a period of time sufficient to crosslink said precursor material;
    (c) gradually heating said composition from step (b) in the presence of a flowing non-reactive inert gas or in a vacuum to a temperature in excess of 400° C. up to a maximum temperature ($T_{max}$) of about 650° C. to form said nanoporous ceramic product; and
    d) gradually cooling said nanoporous ceramic product.

2. The process of claim 1 wherein said crosslinking agent has the structure H—R—H wherein R is a polyvalent radical selected from the group consisting of O, S, NH and functionalized organic radicals containing 1 to 40 carbon atoms.

3. The process of claim 2 wherein said crosslinking agent is a solid or liquid above 100° C. and wherein said contact in step (b) is accomplished by forming a mixture of said crosslinking agent and said ceramic precursor material.

4. The process of claim 3 wherein said mixture is formed by dissolving said ceramic precursor and said crosslinking agent in organic solvent and evaporating said solvent.

5. The process of claim 2 wherein said crosslinking agent is in the form of a gas or vapor and wherein said contact in step (b) is accomplished by passing said gas or vapor through or over said ceramic precursor material during said heating step.

6. The process of claim 5 wherein said crosslinking agent is ammonia gas.

7. The process of claim 5 wherein said crosslinking agent is water vapor.

8. The process of claim 1 wherein said heating step (c) is carried out in the presence of a non-reactive, inert gas selected from the group consisting of helium, argon, nitrogen and neon.

9. The process of claim 8 wherein said non-reactive inert gas is helium.

10. The process of claim 1 wherein said nanoporous ceramic product has a surface area in excess of 100 $m^2$/gm and a volume of open pore micropores of greater than about 0.08 $cm^3$/gm.

11. The process of claim 10 wherein said surface area is in excess of 200 $m^2$/gm and said volume of micropores is greater than 0.12 $cm^3$/gm.

12. The process of claim 1 wherein said maximum heating temperature in step (c) is about 625° C.

13. The process of claim 1 wherein the maximum heating temperature in step (b) is about 350° C.

14. The process of claim 1 wherein the heating temperature range in step (c) is about 475° to 600° C.

15. The process of claim 1 wherein the rate of heating in step (b) is less than 5° C. per minute.

16. The process of claim 1 wherein the rate of heating in step (c) is less than 5° C. per minute.

17. The process of claim 1 wherein the product of step (b) is held at $T_{int}$ for a period of from about 30 minutes to 6 hours prior to step (c).

18. The process of claim 1 wherein the product of step (c) is held at $T_{max}$ for a period of from about 30 minutes to 6 hours prior to cooling said ceramic product.

19. The process of claim 1 wherein said ceramic precursor is first dissolved in an organic solvent followed by evaporation of the solvent prior to step (b).

20. The process of claim 1 wherein said ceramic precursor is selected from the group consisting of polysilazanes, polysiloxazanes, polycarbosilazanes, perhydropolysilazanes, polycarbosilanes, vinylic polysilanes, amine boranes, polyphenylborazones, carboranesiloxanes, polysilastyrenes, polytitanocarbosilanes and mixtures thereof.

21. The process of claim 20 wherein said ceramic precursor comprises a polysilazane.

22. The process of claim 20 wherein said ceramic precursor comprises a polycarbosilane.

23. The process of claim 20 wherein said ceramic precursor comprises a polysilastyrene.

24. A nanoporous ceramic product having a surface area in excess of 70 $m^2$/gm and a volume of open-pore micropores, which have a mean width of less than 20 Angstroms, of greater than about 0.03 $cm^3$/gm, said product prepared by the process of claim 1.

25. The ceramic product of claim 24 having a surface area in excess of about 100 $m^2$/gm.

26. The ceramic product of claim 25 having a surface area in excess of about 200 $m^2$/gm and a micropore volume of greater than about 0.08 $cm^3$/gm.

27. The ceramic product of claim 25 having a surface area in excess of about 300 $m^2$/gram and a micropore volume of greater than about 0.12 $cm^3$/gram.

28. The ceramic product of claim 24 in the form of a thin membrane.

* * * * *